(12) United States Patent
Fields et al.

(10) Patent No.: US 8,117,239 B2
(45) Date of Patent: Feb. 14, 2012

(54) AGGREGATING SCHEMA DATA FROM MULTIPLE SOURCES

(75) Inventors: David Fields, Kirkland, WA (US); Paolo Marcucci, Seattle, WA (US); Carlos Brito, Sammamish, WA (US); Scott Hysom, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 12/055,012

(22) Filed: Mar. 25, 2008

(65) Prior Publication Data
US 2009/0248728 A1   Oct. 1, 2009

(51) Int. Cl.
G06F 7/00 (2006.01)
(52) U.S. Cl. ...................................................... 707/803
(58) Field of Classification Search .................. 707/791, 707/802, 803, 808
See application file for complete search history.

(56) References Cited

U.S. PATENT DOCUMENTS

| | | | |
|---|---|---|---|
| 5,806,066 A * | 9/1998 | Golshani et al. ................. | 1/1 |
| 5,809,497 A | 9/1998 | Freund et al. | |
| 5,970,490 A * | 10/1999 | Morgenstern ..................... | 1/1 |
| 6,161,103 A * | 12/2000 | Rauer et al. ....................... | 1/1 |
| 6,282,547 B1 * | 8/2001 | Hirsch ........................ | 715/207 |
| 6,374,252 B1 | 4/2002 | Althoff et al. | |
| 6,578,046 B2 | 6/2003 | Chang | |
| 6,662,179 B2 | 12/2003 | Benjamin et al. | |
| 7,133,871 B2 | 11/2006 | Sluiman | |
| 7,162,488 B2 | 1/2007 | DeVorchik | |
| 7,177,862 B2 | 2/2007 | Zhang | |
| 2003/0028511 A1 | 2/2003 | Sluiman | |
| 2004/0225669 A1 * | 11/2004 | Isaacson et al. ............. | 707/101 |
| 2005/0060337 A1 | 3/2005 | Chou | |
| 2005/0149496 A1 | 7/2005 | Mukherjee | |
| 2006/0173868 A1 * | 8/2006 | Angele et al. ................. | 707/100 |
| 2006/0253421 A1 | 11/2006 | Chen | |
| 2006/0253459 A1 | 11/2006 | Kahn | |
| 2006/0259462 A1 | 11/2006 | Timmons | |
| 2007/0078824 A1 | 4/2007 | Dorgelo | |
| 2008/0027930 A1 * | 1/2008 | Bohannon et al. ................ | 707/6 |

OTHER PUBLICATIONS

Michael Douma, PHP Search Engine Showdown, http://www.onlamp.com/lpt/a/6466, Mar. 23, 2007.
Introduction to Oracle Secure Enterprise Search, http://docs.huihoo.com/oracle/docs/B28527_01/doc/search.1016/b19002/over.htm, Oct. 24, 2007.
International Search Report for PCT/US2009/035529, Jul. 23, 2009.
Introduction to Oracle Secure Enterprise Search, http://docs.huihoo.com/oracle/docs/B28527_01/doc/search.1015/b19002/over.htm, Oct. 24, 2007.
Non Final Office Action of U.S. Appl. No. 12/054,998, mailed Jun. 10, 2010. Final Office Action of U.S. Appl. No. 12/054,998, mailed Dec. 23, 2010.
Office Action mail date: Dec. 23, 2010, U. S. Appl. No. 12/054,998, 18 pages.
Non-Final Office Action mailed Aug. 16, 2011 regarding U.S. Appl. No. 12/054,998, 19 pages.

* cited by examiner

*Primary Examiner* — Hung T Vy
(74) *Attorney, Agent, or Firm* — Shook, Hardy & Bacon L.L.P.

(57) ABSTRACT

Systems, methods, and computer-readable media for aggregating schema data from two or more schemas are provided. Embodiments of the present invention include receiving schema definitions for two or more schemas. An aggregated property description for an individual property that is common to the two or more schemas may be created. The aggregated property description includes property attribute values that are the same for the property description in both schemas. Where the attribute values are different, rules may be applied to determine which attribute value to include in the aggregated property description. In one embodiment, the less capable of the two different attribute values is included in the aggregated property description.

13 Claims, 6 Drawing Sheets

AGGREGATING SCHEMA DATA FROM MULTIPLE SOURCES

BACKGROUND

A data store may be associated with a schema that includes one or more properties that are described by a collection of attributes. Individual data stores may have unique schemas. The schema may be accessed by applications interacting with the data in the data store. The schema may provide information to the application regarding the format and characteristics of data and/or data fields within the data store.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to aggregating data from multiple schemas. In one embodiment, a first schema describing a first data store includes one or more properties that may be described by a combination of static information and contextual information. Similarly, a second schema describing a second store may contain one or more properties that are likewise described by a combination of static and contextual information. The first and second schema may contain the same property. In this case, the static information describing the property may be contained in the first schema and referenced by the second schema. The contextual information describing the property in the first schema and the second schema may be different. In an embodiment of the present invention, an aggregated property description is built for a property that is included in both the first and second schema. The aggregated property description may include the static information and the contextual information from first schema and the contextual information from the second schema.

BRIEF DESCRIPTION OF THE DRAWINGS

The present invention is described in detail below with reference to the attached drawing figures, wherein.

DETAILED DESCRIPTION

Figure 1:
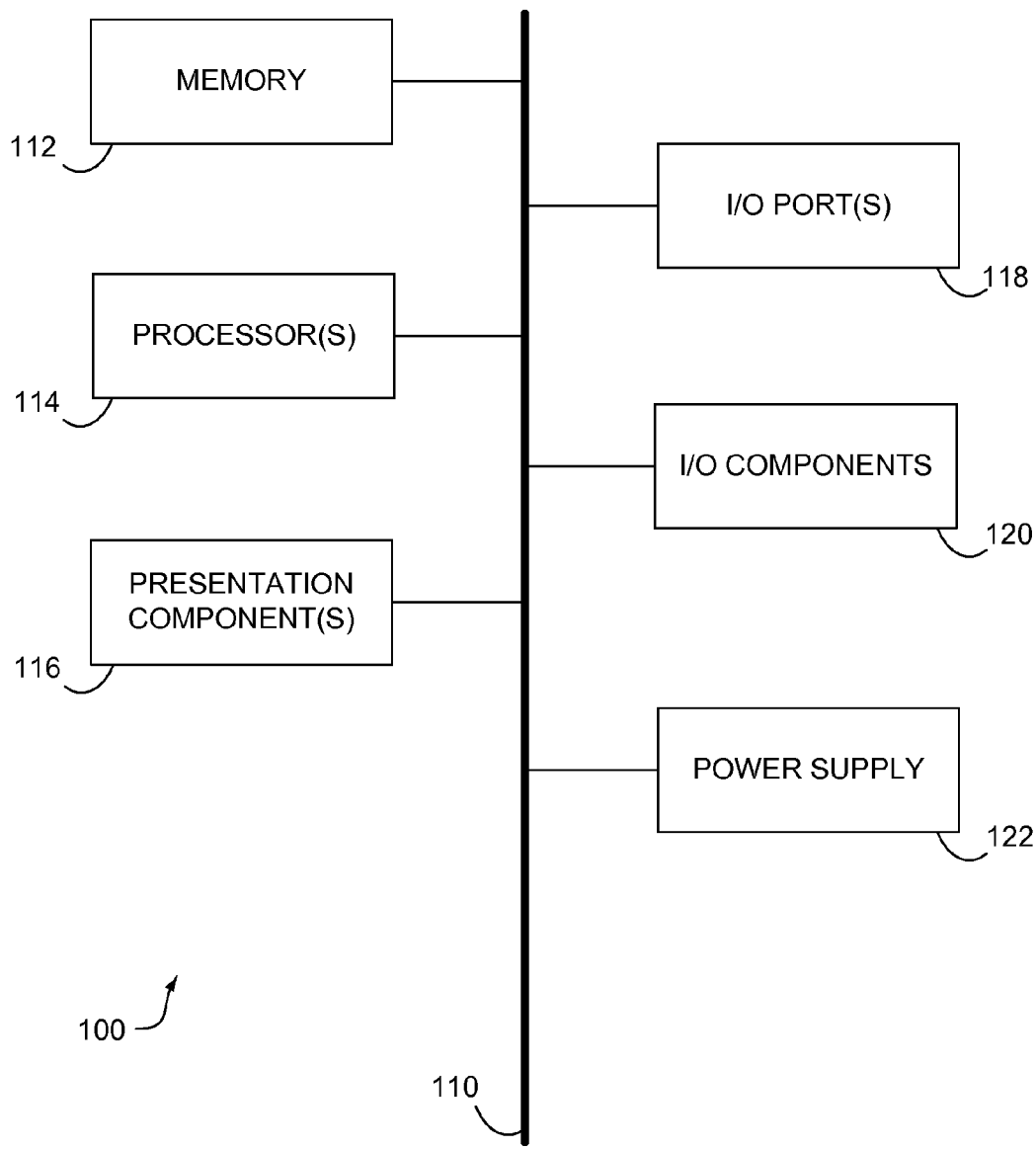
FIG. 1 is a block diagram of an exemplary computing environment for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In one embodiment, the searching of multiple data stores and the presentation of unified results is facilitated by generating an aggregated property description derived from the schemas describing the multiple data stores. For example, a user may want to search a data store associated with online book retailer 1 and a second data store associated with online book retailer 2. A typical search may look for a book based on title, author, publisher, or other such information. This information is stored in both data stores in a manner defined by the schemas used to describe the respective data stores. Among other things, the schema describes properties of the data store by setting forth attributes of the properties. Property attributes in the schema should not be confused with the property values in the data store. For example, Jack London could be a property value in the author field in the data store, whereas the property description in the schema contains the attributes (e.g. field length, number of authors, type) that define the type of data that can be stored in the author field in the data store.

In embodiments of the present invention, the two data stores may contain the same property having identical static attributes and potentially different contextual attributes. For example, the name of the property (e.g., "author") is a static attribute that would need to be the same in both property descriptions. On the other hand, the field length attribute could be different in both property descriptions and is, therefore, a contextual attribute. Embodiments of the present invention generate a single aggregated property description that may be used by applications to search and present data from both data sources. For example, an aggregated property description for the author property would contain the static attribute values, and contextual attribute values that are identical in both property descriptions. Where the contextual attribute values are different, various rules may be run to resolve the difference and provide an attribute value. Examples of rules include averaging the attributes values, selecting the most capable attribute value, and selecting the least capable attribute value. In one embodiment, the rule selects the least capable attribute value for inclusion in the aggregated property description. An example of a least capable attribute value is a field length attribute with an attribute value of 10 in contrast to a field length attribute value of 20.

A schema usable with embodiments of the present invention may include a property description that includes both static information and contextual information to describe a property of its associated data store. While the contextual information is specific to the property for the present data store, the static information from the property description applies to that property in all data stores. In particular, other schemas may include a property reference that references the static information from the property description in the first schema and then sets forth the contextual information for the property for their respective data stores. In other words, multiple data stores may include the same property. The static information for that property will be set forth by a property description in one schema and will be referenced by a property reference in other schemas. Each schema will then specify the contextual information for that property that is particular to its respective data store (one schema sets forth the contextual information in a property description, while the other schemas set forth the contextual information in a property reference.) A schema suitable for use with embodiments of the present invention is described in U.S. patent application Ser. No. 12/054,998, filed on even date herewith, entitled "SCHEMA FOR FEDERATED SEARCHING."

Accordingly, in one embodiment, the present invention relates to computer storage media having computer-executable instructions embodied thereon for performing a method for aggregating schema data from two or more schemas. The method includes receiving a plurality of static attributes associated with a plurality of static attribute values for a first property. The method also includes receiving from a first schema a plurality of contextual attributes associated with a first plurality of contextual attribute values for the first property and receiving from a second schema the plurality of contextual attributes associated with a second plurality of contextual attribute values for the first property. The method further includes generating an aggregated first property description including the plurality of static attributes associated with the plurality of static attribute values and the plurality of contextual attributes associated with a third plurality of contextual attribute values, wherein the third plurality of contextual attribute values are selected from the first plurality of contextual attribute values and the second plurality of contextual attribute values. The method further includes communicating the aggregated first property description.

In yet another embodiment, the present invention relates to a computerized system for aggregating property attribute values across two or more schemas associated with two or more data sources. The system includes a schema reception component for receiving at least a first schema and a second schema, wherein the first schema contains at least a first property described by a plurality of static attributes and a plurality of contextual attributes associated with a first plurality of contextual attribute values, and wherein the second schema contains at least a reference to the first property and the first property is further described by the plurality of contextual attributes associated with a second plurality of contextual attribute values. A contextual attribute value for a contextual attribute in the first schema may be different than the contextual attribute value for the contextual attribute in the second schema. The system also includes a schema property request component for receiving a request for an aggregated first property description based on the first schema and the second schema. The system further includes a property description component for building the aggregated first property description from the plurality of static attributes and the plurality of contextual attributes associated with contextual attributes selected from either the first plurality of contextual attribute values or the second plurality of contextual attribute values. The system further includes a communication component for communicating the aggregated first property description.

In another embodiment, the present invention relates to a computerized method for generating an aggregated attribute values between two or more schemas. The method including receiving a first selection associated with a first schema, the first schema including a first plurality of properties including a first property, the first property including a plurality of static attributes and a plurality of contextual attributes, the plurality of contextual attributes including a first individual attribute associated with a first attribute value. The method also includes receiving a second selection associated with a second schema, the second schema including a second plurality of properties including the first property from the first schema, the first property including the plurality of contextual attributes, the plurality of contextual attributes including the first individual attribute with an associated second attribute value that is different than the first attribute value. The method also includes generating an aggregated first property description that includes the plurality of static attributes and the first individual attribute associated with a third attribute value that is determined by running a rule over the first attribute value and the second attribute value, and communicating the aggregated first property description.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-usable instructions, including computer-executable instructions such as program components, being executed by a computer or other machine, such as a personal data assistant or other handheld device. Generally, program components including routines, programs, objects, components, data structures, and the like, refer to code that perform particular tasks, or implement particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O port(s) 118 allow computing device 100 to be logically coupled to other devices including I/O components 120, some of which may be built in. Illustrative components include a microphone, joystick, game pad, satellite dish, scanner, printer, wireless device, etc.

Figure 2:
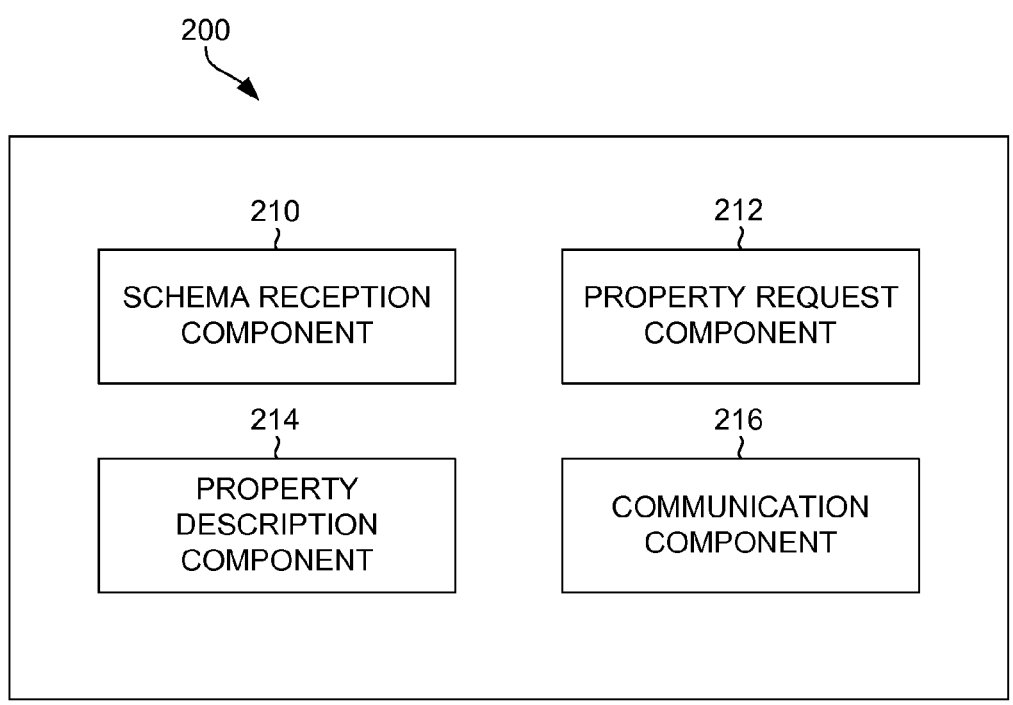
FIG. 2 is a block diagram of an exemplary computing system architecture suitable for use in implementing embodiments of the present invention.

Turning now to FIG. 2, a block diagram is illustrated that shows an exemplary computing system architecture 200 suitable for aggregating property attribute values across two or more schemas, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes a schema reception component 210, and property request component 212, a property description component 214, and a communication component 216. Computing system architecture 200 may reside on a single computing device, such as computing device 100 shown in FIG. 1. In the alternative, computing system architecture 200 may reside in a distributed computing environment that includes multiple computing devices coupled with one another via one or more networks. Such networks may include, without limitation, one or more local area networks (LANs) and/or one or more wide area networks (WANs). Such network environments are commonplace in offices, enterprise-wide computer networks, intranets, and the Internet. Accordingly, the network, or combination of networks, is not further described herein.

Schema reception component 210 is configured to receive one or more schemas. A schema provides information about the structure of data in a data store. Each schema received may be associated with a corresponding data store. All of the information within a schema may be retrieved or only certain aspects of a schema may be retrieved as needed. The schemas may be received in response to the selection of one or more data stores for searching or other purposes. For example, a user may select two or more data sources through which they desire to search. In one embodiment, the schema reception component 210 seeks the appropriate schemas associated with selected data stores. The schemas may reside on any computer storage device that is communicatively coupled to the device on which the schema reception component 210 resides. Further, a schema may be supplied to the schema reception component 210 in advance and retrieved upon the need to interact with data in a data store associated with the schema. Other means of receiving or retrieving schemas are possible.

The property request component 212 is configured for receiving a request for a description of one or more properties within the one or more schemas received by the schema reception component 210. A property is a component of a schema that may be utilized to describe aspects of the data structure. A property is described by attributes that are associated with attribute values. For example, a property attribute might be "name" and an associated attribute value could be "System.Start_Date." Thus, the name of the property would be system start date. Examples of the attributes that might be used to describe a property include field length, data type, data format, label, the maximum value, the minimum value and is the property queryable. The associated attribute value for an attribute could be a number (e.g., integer, floating point, etc.), true/false, a text string or some other description. In general, several attributes are used to describe a single property.

In some embodiments, a property is described by a property description that sets forth a collection of static attributes and a collection of contextual attributes. The static attributes and attribute values are immutable and will be the same for all schemas having the property. Examples of static attributes include property name, property type, and property label, whether or not the property supports multiple values, and information about how the property's values should be formatted for display to users. Schemas having the same property that is defined by a property description in another schema will reference that schema and property description for the static attributes and values. The contextual attributes and attribute values may vary among schemas and will be defined by each schema. However, it is possible for schemas to include the same contextual attributes with the same attributes.

Generally, an attribute may be designated as static if it must have the same value across multiple schemas to maintain the fundamental character of the property. If the attribute values may be changed to suit individual data stores, without destroying the fundamental character of the property, then it may be classified as a contextual attribute. Thus, a property description describes a property by setting forth the static and contextual attributes included in the property and the attribute values associated with the respective attributes. The static attributes of the property description apply to all schemas that include the property including the schema with the property description and other schemas that reference the property description for that schema (e.g., as will be described in further detail below). The contextual attributes of the proper description apply to only the schema including the property description.

As noted above, a schema may refer to properties that are defined in other schemas by using property references. A property reference refers to a property description in another schema, such that the static attributes and attribute values from that property description are used to describe a given property for a data store. Additionally, the property reference includes contextual attributes and attribute values to describe the property for that data store. Together, the static attributes and values from the referenced property description and the contextual attributes and values defined by the property reference describe a property of the data store.

A property description component 214 is configured to generate an aggregated property description of a property that is included in two or more schemas. An aggregated property description is a single property description built using the static attributes and contextual attributes chosen from the property descriptions from more than one schema. The aggregated property description will include the static attributes and the associated attribute values of the property. Further, all of the contextual attributes for the property will be included. The values selected for association with the contextual attributes are chosen using rules that run over the combined contextual attributes. In one embodiment, the less capable of two conflicting attribute values are included in the aggregated property description. For example, a field length value attribute with an attribute value of 50 is less capable then an attribute value of 100. Where the attribute value associated with a contextual attribute is the same for the same property in two or more schemas, then that value is included in the aggregated property description. The property description component 214 may create aggregated property descriptions for multiple properties that are found in two or more schemas.

The communications component 216 is configured to communicate the aggregated property description to the application or component that requested the property description.

Figure 3:
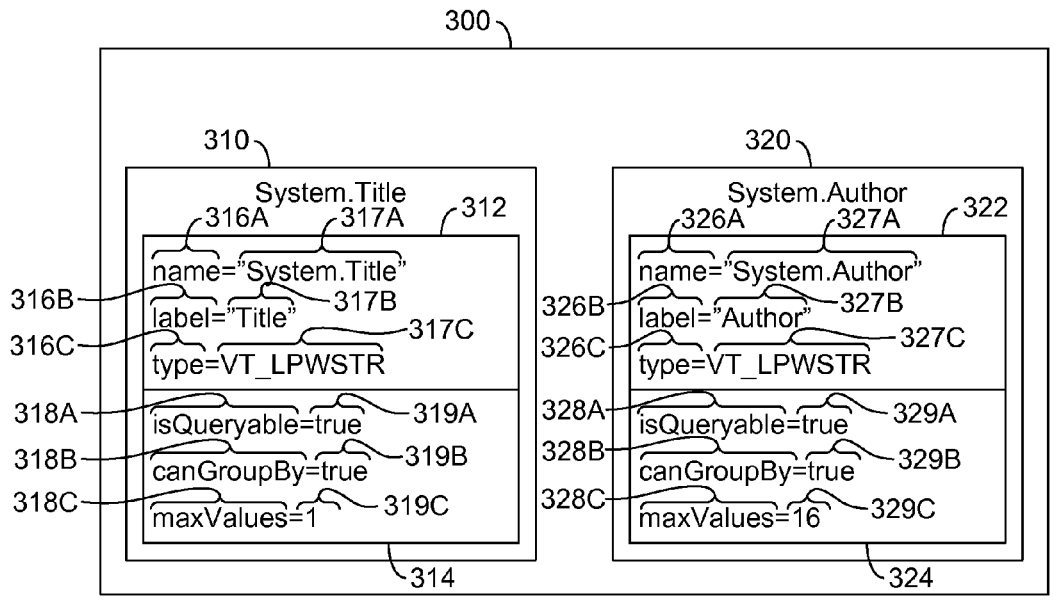
FIG. 3 is an illustration of a first schema definition that is suitable for use with embodiments of the present invention.

By way of example, with reference to FIG. 3, an illustration of a first schema definition that is suitable for use with embodiments of the present invention is shown and designated generally as reference numeral 300. Schema definition 300 includes property 310 and property 320. Property 310 is titled "System.Title" and includes a block of static information 312 and a block of contextual information 314. The static information 312 includes the attribute 316A "name," attribute 316B "label," and attribute 316C "type." Each attribute corresponds with an attribute value 317A, 317B, and 317C. Thus, attribute 316A name corresponds with attribute value 317A "System.Title." Attribute 316B "label" corresponds with attribute value 317B "Title." Similarly, contextual information 314 contains attributes 318A, 318B, and 318C each corresponding respectively with an attribute value 319A, 319B, and 319C. Property 320 includes static information block 322 and contextual information block 324. Static information block 322 includes attributes 326A, 326B, and 326C, each corresponding respectively with attribute value 327A, 327B, and 327C. Similarly contextual information block 324 includes attribute 328A, 328B, and 328C each corresponding respectively with attribute value 329A, 329B, and 329C. Schema definition 300 is just one example of a schema definition that may be suitable for use in embodiments of the present invention. In general, a schema would have a large number of properties, but only two are shown for the sake of simplicity. Similarly, each property could have a large number of attributes but only six attributes are shown for the sake of simplicity.

Figure 4:
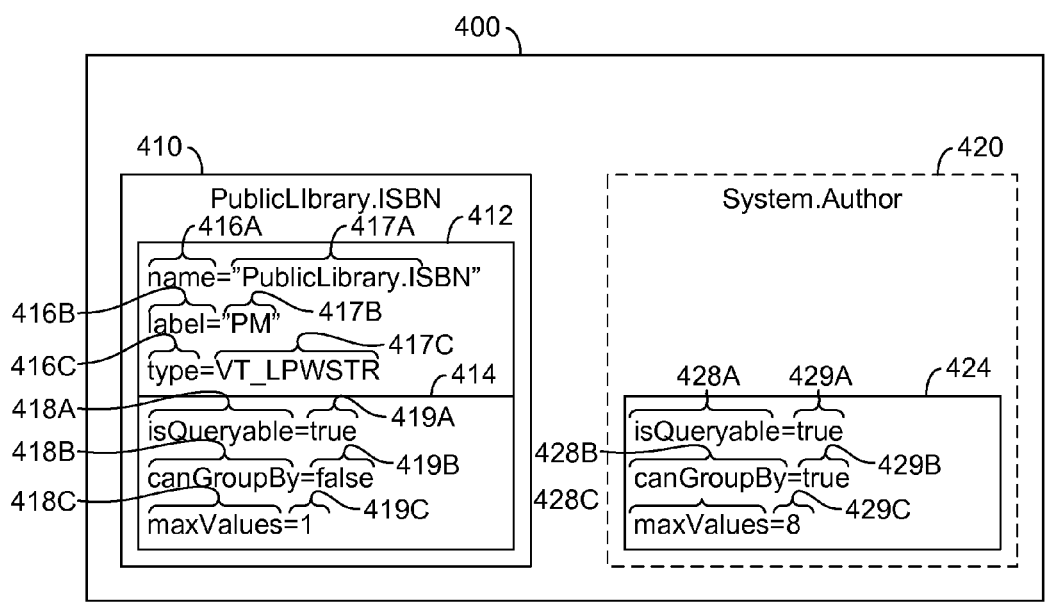
FIG. 4 is an illustration of a second schema definition that is suitable for use with embodiments of the present invention.

By way of example, and with reference to FIG. 4, a second exemplary schema definition suitable for use with embodiments of the present invention is shown and designated generally as reference numeral 400. Schema definition 400 includes property 410, and property reference 420. Property 410 includes static information block 412 and contextual information block 414. Static information block 412 includes attributes 416A, 416B, and 416C. Each attribute corresponds respectively with attribute value 417A, 417B, and 417C. Contextual information block 414 includes attribute 418A, 418B, and 418C. Each attribute corresponds respectively with attribute value 419A, 419B, and 419C. Property reference 420 references the static information 322 from property 320 within schema definition 300. For that reason, property reference 420 does not contain a static block of information. The static information for property reference 420 would be supplied by retrieving it from property 320 in schema definition 300. Property reference 420 contains contextual information block 424 that is added to the static information 312 to form the property description for property reference 420. Contextual information block 424 includes attribute 428A, attribute 428B, and attribute 428C. Each attribute corresponds respectively with attribute value 429A, 429B, and 429C. Contextual information block 424 includes the same attributes as contextual information block 324. However, the attribute values associated with the attributes differ. Specifically, the attribute value 329C associated with the maxValues attribute 328C in contextual information block 324 is 16 while the corresponding attribute value 429C in contextual information block 424 is 8.

Figure 5:
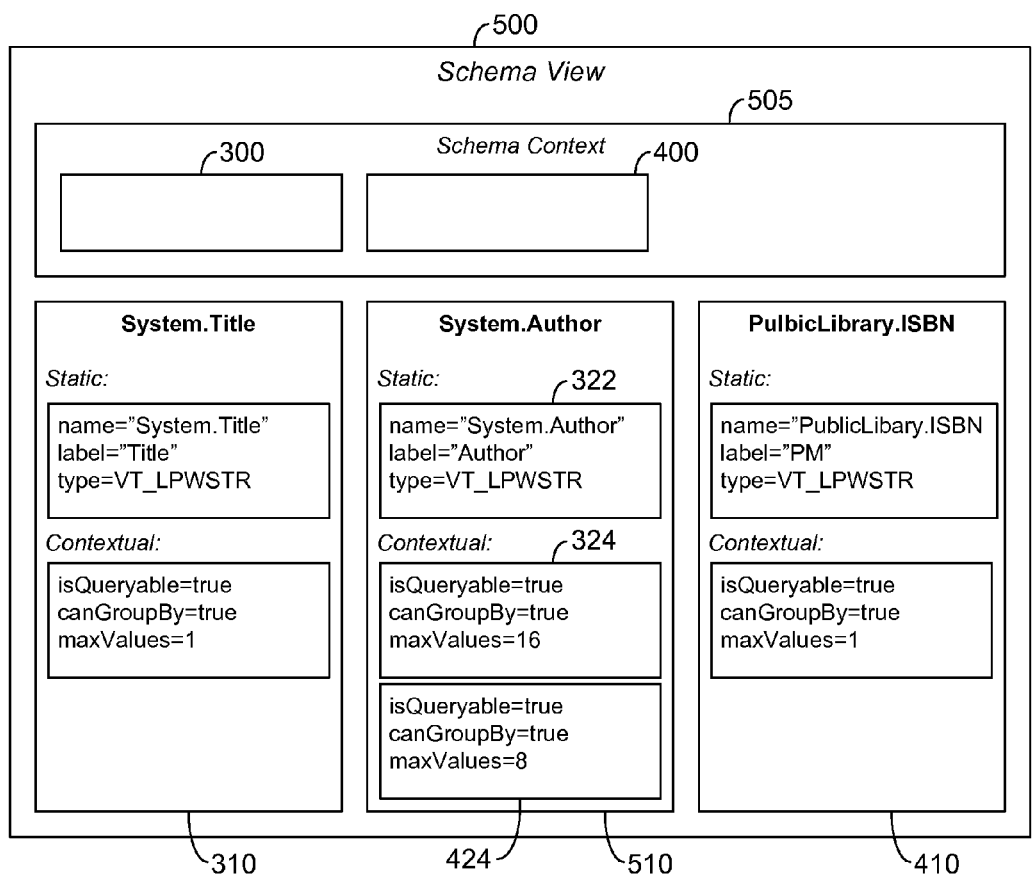
FIG. 5 is an illustration of a schema view illustrating information accessed across two or more schemas, in accordance with an embodiment of the present invention.

By way of example, and with reference to FIG. 5, a schema view 500 illustrating the enumeration of schema definition 300 and schema definition 400 is shown. The enumeration determines which properties from the two schemas are included in the joint schema view. Various rules may be used to determine which properties to include in the joint schema view. In this example, a union enumeration rule is run that causes one copy of each property from the two schemas to be included. Duplicates are reconciled into an aggregated property. In this case, property 310 from schema definition 300 is shown with all of the information contained in property 310. Property 410 is also shown with all of the information contained in it. Aggregated property 510 includes information from schema definition 300 and schema definition 400. Static information block 322 and contextual information block 324 are included from schema definition 300. Contextual information block 424 from schema definition 400 is also included in aggregated property 510. In one embodiment, an intersection enumeration rule is run that causes only properties present in all of the joined schemas to be included. Different enumeration rules may be run depending on the reason for combining the schemas.

An aggregated property description may be built using the information contained in schema view 500. When an aggregated property description is requested for aggregated property 510, static information 312 will be included and rules will be run over contextual information block 324 and contextual information block 424 to determine which attribute values to associate with the respective attribute. When the attribute value associated with the attribute is the same in contextual information block 324 and contextual information block 424, then that attribute value will be chosen for inclusion within the aggregated property description. For example, attribute 328 and corresponding attribute 428 is associated with attribute value 329A, 429A "true" in both contextual information block 324 and contextual information block 424. Thus, "true" would be associated with attribute 328 within the aggregated property description. On the other hand, when the attribute value associated with the attribute is different in contextual information block 324 and contextual information block 424, then the rule will run to determine the least capable of the two attribute values. For example, the attribute value associated with attribute 328C in contextual information block 324 is "16" while the attribute value associated with attribute 328C in contextual information block 424 is "8." In this case, "8" is a less capable max value than "16", therefore, attribute value "8" would be selected for inclusion within the aggregated property description. As stated previously, more than two schemas could be selected and therefore more than two blocks of contextual information could be reconciled to generate a single aggregated property description.

Figure 6:
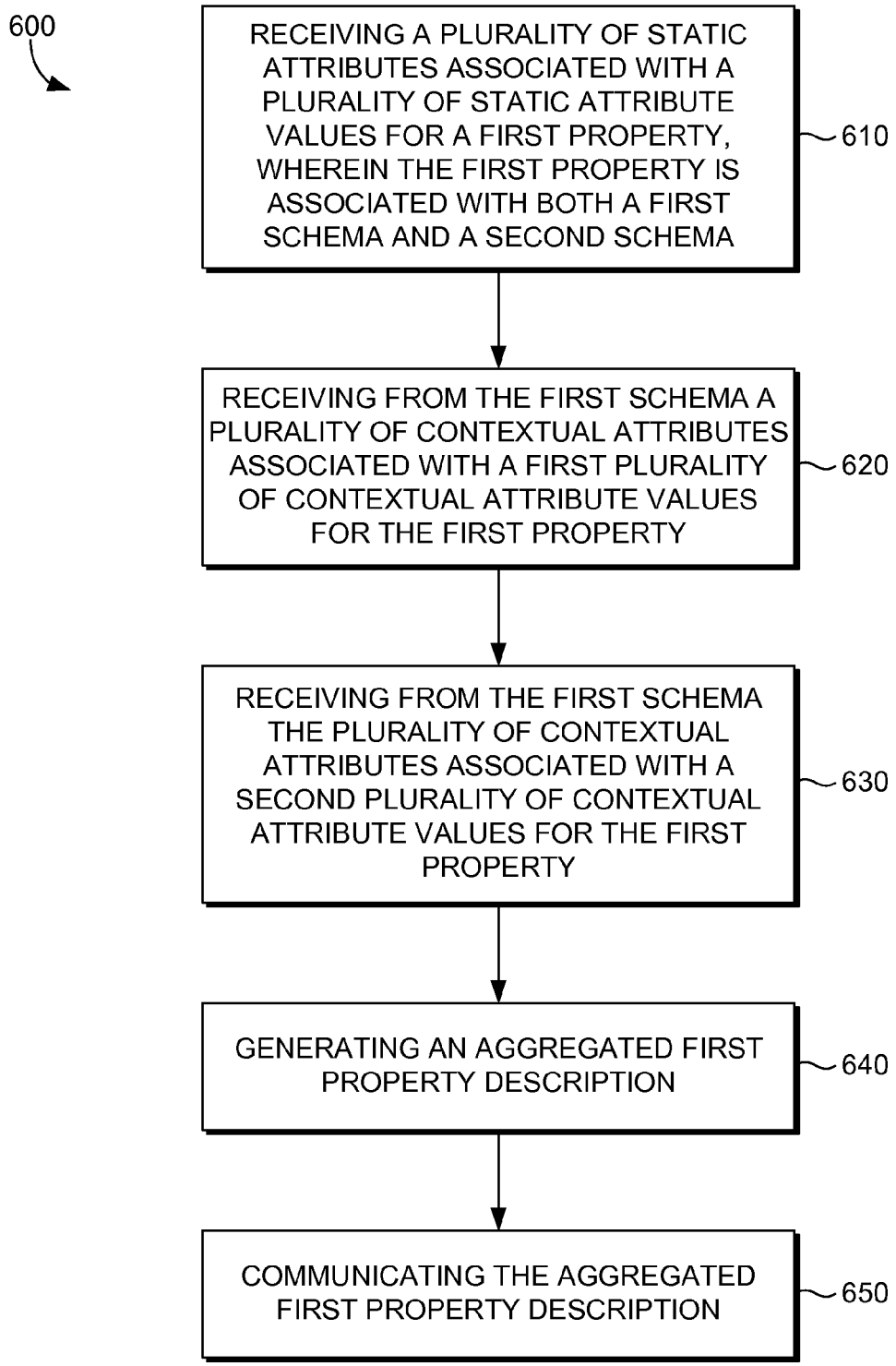
FIG. 6 is a flow diagram illustrating an exemplary method for aggregating schema data from two or more schemas, in accordance with an embodiment of the present invention.

Referring next to FIG. 6, a flow diagram showing an exemplary method for aggregating schema data from two or more schemas is shown and designated generally as reference numeral 600. At step 610, a plurality of static attributes associated with a plurality of static attribute values for a first property is received. The first property is associated with both a first schema and a second schema. For example, property 320 in FIG. 3, and property 420 in FIG. 4 are common to the two schemas. In one embodiment, the static information for the first property will be described in the first schema and referenced by the second schema. As described previously, the contextual properties that describe the first property may be different in the first and second schemas.

At step 620, a plurality of contextual attributes associated with a first plurality of contextual attribute values for the first property are received from the first schema. At step 630, a second plurality of contextual attribute values for the first property are received from the second schema, in each case, each contextual attribute will be associated with a single contextual attribute value.

At step 640, an aggregated first property description is generated. The aggregated first property description includes the plurality of static attributes associated with the plurality of static attribute values. The aggregated first property description also includes the plurality of contextual attributes associated with a third plurality of contextual attribute values that are selected from the first plurality of contextual attribute values and the second plurality of contextual attribute values. In one embodiment, contextual attribute values are selected from the first plurality of contextual attribute values and a second plurality of contextual attribute values based on which attribute value is the least capable. For example, an attribute value allowing 10 names could be less capable than an attribute value allowing 20 names. At step 650, the aggregated first property description is communicated (e.g. to an application, search utility).

Figure 7:
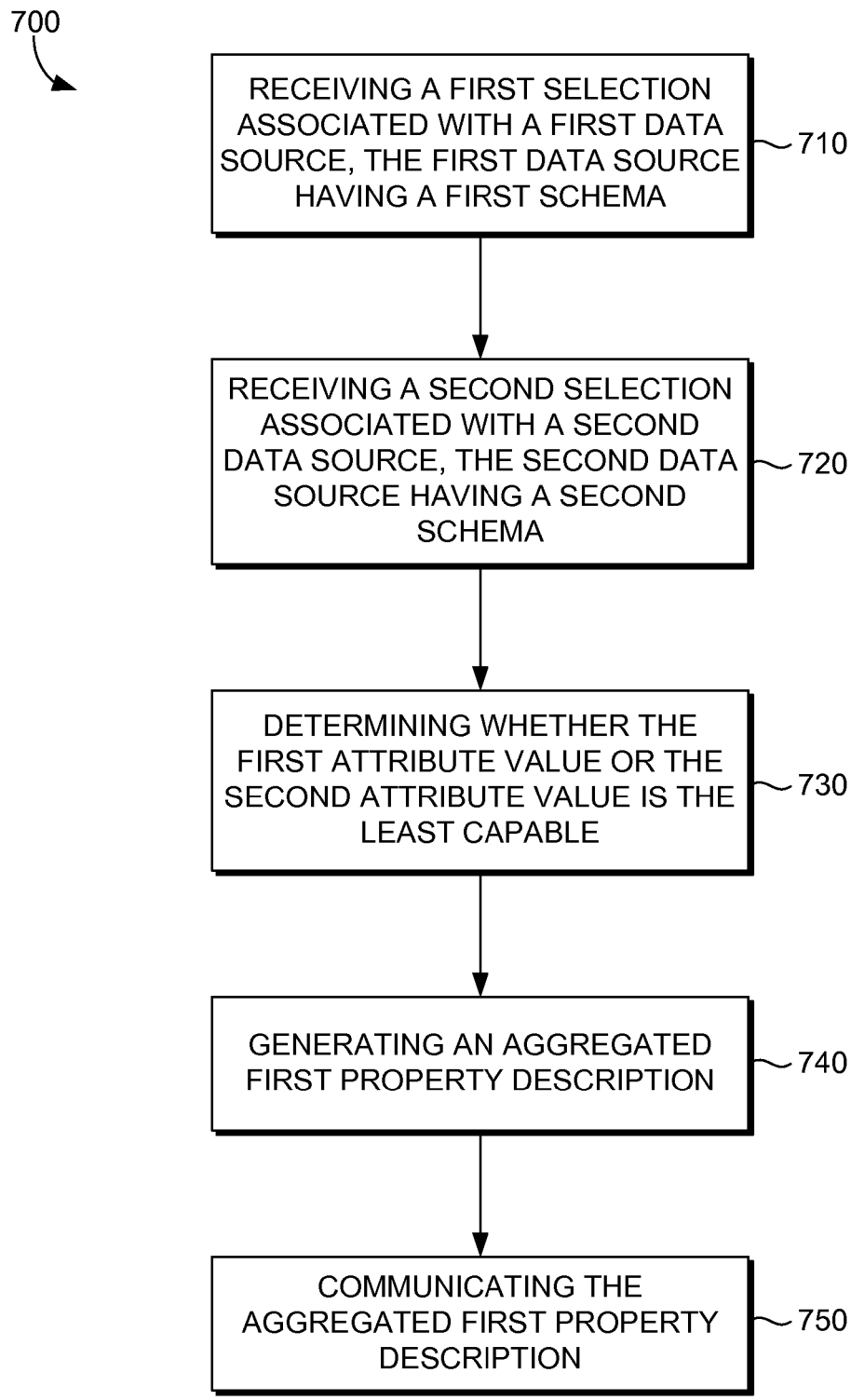
FIG. 7 is flow diagram illustrating an exemplary method for generating an aggregated attribute value between two or more schemas, in accordance with an embodiment of the present invention.

Referring next to FIG. 7, a flow diagram showing an exemplary method for generating an aggregated attribute value between two or more schemas is shown and designated generally with reference numeral 700. At step 710, a first selection associated with a first schema is received. The first schema includes a first plurality of properties including a first property. The first property includes a plurality of static attributes and a plurality of contextual attributes. The plurality of contextual attributes includes a first individual attribute associated with a first attribute value.

At step 720, a second selection associated with a second schema is received. The second schema includes a second plurality of properties in including the first property from the first schema. The first property includes the plurality of contextual attributes. The plurality of contextual attributes include the first individual attribute with an associated second attribute value that is different than the first attribute value associated with the first property in the first schema.

At step 730, it is determined whether the first attribute value or the second attribute value associated with the first property in the first schema and second schema respectively is the least capable. At step 740, an aggregated first property description including the plurality of static attributes in the first individual attribute is generated. In one embodiment, the least capable of the first attribute value and the second attribute value is chosen for inclusion within the aggregated first property description. At step 750, the aggregated first property description is communicated (e.g. to an application, search utility).

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A method for aggregating property attribute values across two or more schemas associated with two or more data sources, the method comprising:

receiving at least a first schema and a second schema, wherein the first schema includes at least a first property described by a plurality of static attributes and a plurality of contextual attributes associated with a first plurality of contextual attribute values, and wherein the second schema includes the first property described by a property reference to the first property from the first schema that includes a second plurality of contextual attribute values for the plurality of contextual attributes, wherein a contextual attribute value for a contextual attribute in the first schema is different than the contextual attribute value for the contextual attribute in the second schema;

receiving a request for an aggregated first property description of the first property based on the first schema and the second schema;

building, at a computing device, the aggregated first property description from the plurality of static attributes and the plurality of contextual attributes associated with contextual attribute values selected from either the first plurality of contextual attribute values or the second plurality of contextual attribute values, wherein the plurality of static attributes from the first schema are included in the aggregated first property description; and communicating the aggregated first property description.

2. The method of claim 1, wherein each individual contextual attribute is associated with a corresponding contextual attribute value.

3. The method of claim 2, wherein the plurality of contextual attributes within the first schema and within the second schema contain the same individual attributes, wherein a first individual contextual attribute is associated with a first individual contextual attribute value within the first plurality of contextual attribute values and the first individual contextual attribute is associated with a second individual contextual attribute value within the second plurality of contextual attribute values and wherein the second individual context attribute value is different than the first individual contextual attribute value.

4. The method of claim 3, wherein a rule is run to determine whether the first individual contextual attribute value or the second individual contextual attribute value is selected for inclusion in the aggregated first property description and the rule is choosing the least capable of the first individual contextual attribute value or the second individual contextual attribute value.

5. The method of claim 1, wherein a contextual attribute value for a corresponding contextual attribute in the aggregated first property description is the least capable of a first contextual attribute value associated with the corresponding contextual attribute in the first schema and a second contextual attribute value associated with the corresponding contextual attribute in the second schema.

6. The method of claim 1, wherein the method further comprises receiving at least a third schema, wherein the third schema contains at least the first property described by the plurality of contextual attributes associated with a third plurality of contextual attribute values, wherein a contextual attribute value for a corresponding contextual attribute in the aggregated first property description is the least capable of a first contextual attribute value associated with the corresponding contextual attribute in the first schema, a second contextual attribute value associated with the corresponding contextual attribute in the second schema, and a third contextual attribute value associated with the corresponding contextual attribute in the third schema.

7. The method of claim 1, wherein the aggregated first property description is communicated to a search utility.

8. A method for aggregating property attribute values across two or more schemas associated with two or more data sources, the method comprising:
receiving at least a first schema and a second schema that both include a first property, wherein within the first schema the first property is described by a plurality of static attributes and a plurality of contextual attributes associated with a first plurality of contextual attribute values, and wherein within the second schema the first property is describe by a property reference to the first property in the first schema that includes the plurality of contextual attributes associated with a second plurality of contextual attribute values and applies the static attributes from the first schema to a definition of the first property in the second schema, wherein a contextual attribute value for a contextual attribute in the first schema is different than the contextual attribute value for the contextual attribute in the second schema;
receiving a request for an aggregated first property description of the first property based on the first schema and the second schema;
building, at a computing device, the aggregated first property description from the plurality of static attributes and the plurality of contextual attributes associated with contextual attributes selected from either the first plurality of contextual attribute values or the second plurality of contextual attribute values; and
communicating the aggregated first property description.

9. The method of claim 8, wherein each individual contextual attribute is associated with a corresponding contextual attribute value.

10. The method of claim 9, wherein the plurality of contextual attributes within the first schema and within the second schema contain the same individual attributes, wherein a first individual contextual attribute is associated with a first individual contextual attribute value within the first plurality of contextual attribute values and the first individual contextual attribute is associated with a second individual contextual attribute value within the second plurality of contextual attribute values, and wherein the second individual contextual attribute value is different than the first individual contextual attribute value.

11. The method of claim 10, wherein a rule is run to determine whether the first individual contextual attribute value or the second individual contextual attribute value is selected for inclusion in the aggregated first property description and the rule is choosing the most capable of the first individual contextual attribute value or the second individual contextual attribute value.

12. The method of claim 8, wherein the most capable of a first contextual attribute value associated with a contextual attribute in the first schema and a second contextual attribute value associated with the contextual attribute in the second schema is selected for association with the contextual attribute in the aggregated first property description.

13. The method of claim 8, wherein the aggregated first property description is communicated to a search utility.

* * * * *

UNITED STATES PATENT AND TRADEMARK OFFICE
CERTIFICATE OF CORRECTION

| | | |
|---|---|---|
| PATENT NO. | : 8,117,239 B2 | Page 1 of 1 |
| APPLICATION NO. | : 12/055012 | |
| DATED | : February 14, 2012 | |
| INVENTOR(S) | : Fields et al. | |

It is certified that error appears in the above-identified patent and that said Letters Patent is hereby corrected as shown below:

In the Claims

Column 10, line 48, Claim 3, after "values" insert -- , --.

Signed and Sealed this
Seventeenth Day of February, 2015

Michelle K. Lee
*Deputy Director of the United States Patent and Trademark Office*